J. B. RAND, OF CONCORD, NEW HAMPSHIRE.

Letters Patent No. 87,968, dated March 16, 1869.

IMPROVED COMPOSITION FOR WELDING IRON AND STEEL.

The Schedule referred to in these Letters Patent and making part of the same.

*Know all men by these presents:*

That I, J. B. RAND, of Concord, county of Merrimack, State of New Hampshire, have invented a new and useful Composition, to be Used as a Substitute for Borax in Welding Iron and Steel.

The nature of my invention consists of a composition, made by combining and mixing the following ingredients, namely, ground quartz, chloride of sodium, alum, bitartrate of potassa, copperas, carbonate of soda, sulphate of soda, *sal-ammoniæ*, muriate of ammonia, sulphate of magnesia, phosphate of iron, and valerianate of ammonia.

The quartz I use, and which I prefer, is found in Lyndeborough, New Hampshire, which is a good quality of white quartz; but I do not limit myself to the quartz of this mine, as, no doubt, a like material may be found in other places.

In carrying out my invention, I have the quartz crushed and ground fine. I also pulverize the other articles above named, and mix them in the following proportions:

Five pounds of ground quartz.
Nine ounces chloride of sodium.
One ounce alum.
One-fourth ounce bitartrate of potassa.
Eight ounces copperas.
Half an ounce carbonate of soda.
One-fourth ounce sulphate of iron.
Half an ounce *sal-ammoniæ*.
Three ounces muriate of ammonia.
Half an ounce sulphate of magnesia.
One ounce phosphate of iron.
One ounce valerianate of ammonia.

When the ingredients are thoroughly mixed together, the composition is ready for use.

The above proportions may be varied, without materially affecting the character or value of the compound.

This composition is to be used for the purpose of welding iron and steel, substantially in the same manner that borax is used in the welding-process.

Iron and steel will stand a greater degree of heat, without injury, with the use of this composition, than it will with borax. Besides, the cost of this composition is very much less than borax, necessary to do the same amount of work, and does not injure iron and steel welded by it, as borax does.

I cannot explain the chemical action these ingredients have upon each other, in forming this welding-composition, but from numerous tests and experiments, in combining different materials, for a few years past, in order to produce the best compound for welding-purposes, I am satisfied that this is better than borax, or any composition ever before used for welding iron and steel.

I claim, as a new article of manufacture—

A welding-composition, made of the ingredients and in the manner substantially as described, as set forth in the specification.

J. B. RAND.

Witnesses:
  N. T. RAND,
  N. B. RAND.